June 23, 1959
W. R. LONG
2,891,658
CONVEYOR CLIP
Filed Dec. 30, 1957
2 Sheets-Sheet 1
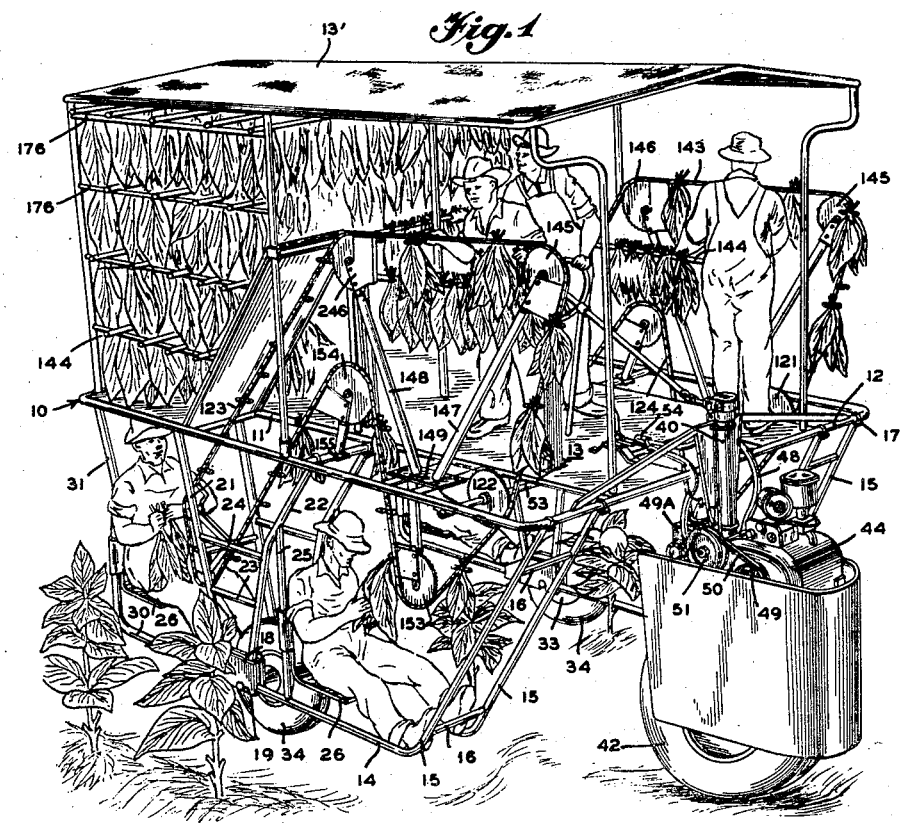
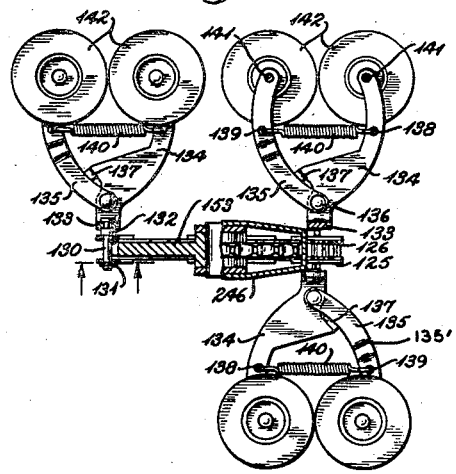
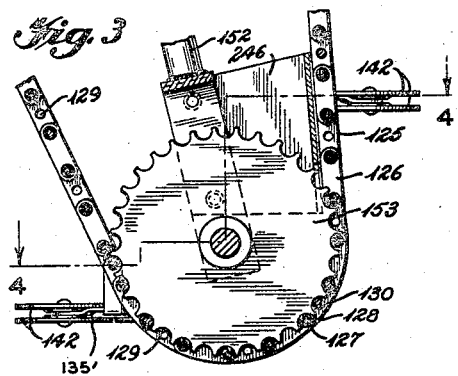
INVENTOR
*W. R. Long*
BY *A. Yates Dowell*
ATTORNEY June 23, 1959  W. R. LONG  2,891,658
CONVEYOR CLIP
Filed Dec. 30, 1957  2 Sheets-Sheet 2
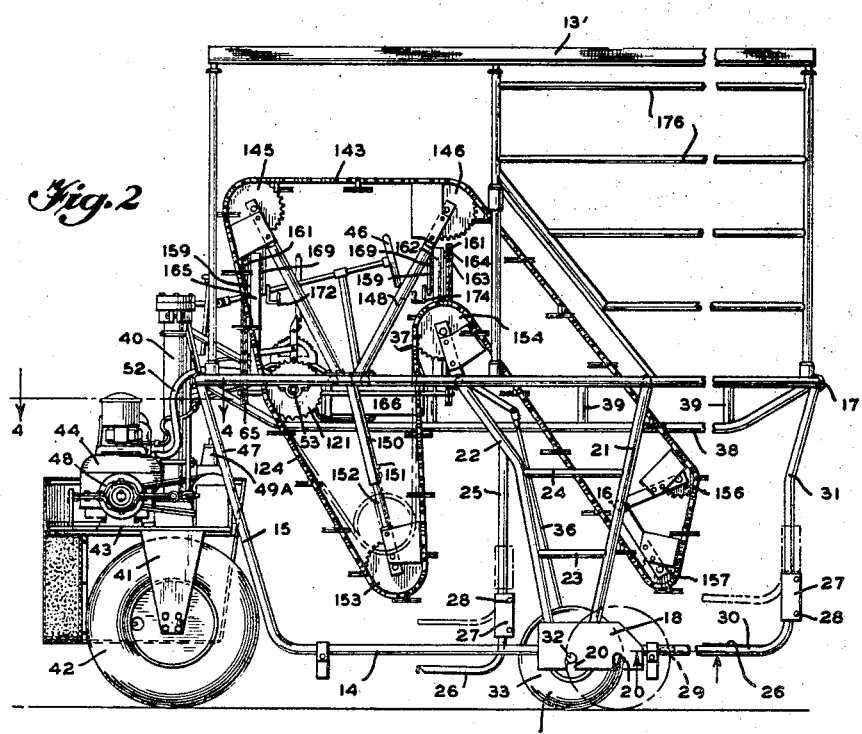
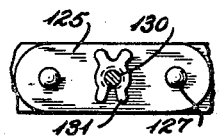
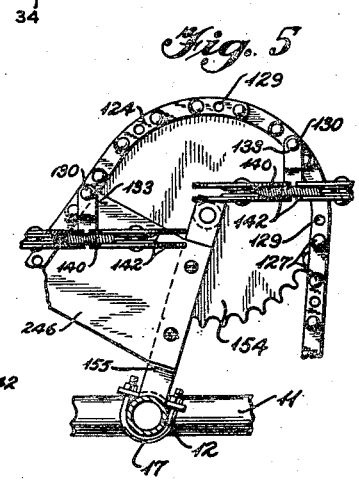
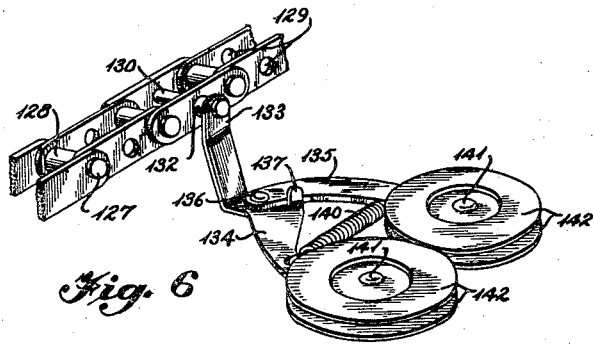
INVENTOR
W. R. Long
BY A. Yates Dowell
ATTORNEY

United States Patent Office 2,891,658
Patented June 23, 1959

2,891,658

CONVEYOR CLIP

William Redden Long, Tarboro, N.C., assignor to Long Manufacturing Co., Inc.

Division of application Serial No. 446,291, July 28, 1954, now Patent No. 2,704,158, dated March 15, 1955. Continuation of application Serial No. 486,250, February 4, 1955. This application December 30, 1957, Serial No. 705,880

6 Claims. (Cl. 198—179)

This application is a division of my prior application Serial Number 446,291, filed July 28, 1954, issued on March 15, 1955, as Patent No. 2,704,158, and a continuation of application Serial Number 486,250, filed February 4, 1955, and relates to a harvesting machine and more particularly to a conveyor and spring clip structure for gripping and elevating articles and particularly for gripping and elevating tobacco leaves in the harvesting thereof.

Heretofore various types of harvesters have been in use, but such harvesters have not been entirely satisfactory because the product, such as tobacco leaves, had to be handled many times with resultant damage to the leaves and excessive costs for the harvesting and drying of the tobacco. Although various types of conveyors have been used in combination with harvesting machines, these conveyors have not satisfactorily handled the tobacco leaves and where clips have been used for engaging the tobacco leaves the juices of the tobacco leaves have accumulated on the clips making a gummy residue which interfered with the use of the clips and required stopping and cleaning.

An object of the present innvention is to provide a machine which overcomes the defects of the prior art.

A further object of the invention is to provide an endless conveyor system for a machine with portions of the conveyor located closely adjacent to workmen who position articles on the conveyor with the conveyor conducting the articles to another location where workmen remove the articles.

Another object of the invention is to provide a harvester with a conveyor in which a single power plant drives the conveyor and propels the machine over the ground while simultaneously driving the conveyor, the speed of the conveyor and the propelling speed of the vehicle being individually controlled.

Another object of the invention is to provide a spring clip structure which resiliently engages articles to be carried and permits ready insertion and removal of such articles.

Another object of the invention is to provide a spring clip for attachment to a conveyor at selected points along a conveyor in accordance with the size of the articles to be conveyed, the speed of the conveyor, and the spacing desired between articles.

A further object of the invention is to provide a spring clip structure which will maintain a horizontal position regardless of the direction of movement of a conveyor on which it may be attached.

A further object of the invention is to provide means for receiving articles from a conveyor so that a minimum of handling of the articles is required.

Other objects and advantages will become apparent from the following description taken in conjunction with the accompanying drawings wherein:

Fig. 1 is a perspective view of a tobacco harvesting machine for movement along tobacco rows and including a vertically extending conveyor for receiving the tobacco leaves closely adjacent the ground and raising the leaves to an elevated position with structure at the elevated position for receiving and supporting tobacco sticks on which the tobacco leaves are looped;

Fig. 2, a side elevation with parts broken away of the machine shown in Fig. 1 including another form of structure for receiving and supporting tobacco sticks on which the leaves are looped;

Fig. 3, a sectional elevation of a depending run of the conveyor showing two of the spring clips in operative position and showing the conveyor chain in engagement with a sprocket wheel;

Fig. 4, a section taken on the broken line 4—4 of Figs. 2 and 3 and showing the alternate arrangement of the spring clips;

Fig. 5, a fragmentary elevation of an upwardly extending intermediate portion of the conveyor showing a conveyor supporting bracket and sprocket thereon;

Fig. 6, a perspective of a spring clip mounted on a portion of the conveyor chain; and Fig. 7, a detail of an outer link of the conveyor chain showing the yoke-shaped fastening clip for engagement in an annular groove of the supporting shank of a spring clip.

With continued reference to the drawings, the machine of the present invention comprises a rectangular frame 10 including longitudinal and transverse mmebers 11 and 12 comprising a support or floor 13 providing a platform for workmen. A canopy 13' may be provided to cover the platform 13 to shield the workmen from the weather. The members 10, 11 and 12 are preferably of tubing and the frame with its platform is supported by auxiliary frames including a pair of spaced horizontal members or bars 14 having upwardly inclined forward portions 15 connected by a pair of transverse bars 16. The auxiliary frames are connected to the main frame by means of U-clamps 17 at their upper ends.

The spaced parallel horizontal tubular members 14 each are provided with a pair of spaced plates 18 clamped on opposite sides of each tubular bar 14, such plates having axle-receiving sockets 19 and 20.

Extending between the plates 18 and connected to the main frame are a pair of upright supports 21 and 22, connected by braces 23 and 24, the upper ends of which upright supports 21 and 22 are connected by the U-clamps 17 with the transverse members 12 of the main frame and afford adjustment laterally of the machine to correspond to the spacing of the rows along which the machine is operated.

The brace 22 is bent slightly relative to its lower portion and has welded or otherwise attached thereto and to the auxiliary frame member 14 an additional brace 25 thus adding rigidity to the structure and providing a support on which seats 26 are adjustably secured by means of clamping sleeves 27 and bolts 28.

The tubular auxiliary frame members 14 terminate a short distance beyond the rear ends of the plates 18 and serve to receive the ends 29 of extension members 30 having upstanding portions 31 which connect by U-clamps 17 to the rear of the frame 10 and on which they can be adjusted as previously indicated. A second seat 26 is adjustable on the upright 31 of each auxiliary frame.

In order to support the main frame toward its rear an axle 32 is disposed transversely of the auxiliary frame in the sockets 19 in the plates 18 and on the axle 32 is mounted a wheel 33 have a pneumatic tire 34 thereon. A wheel 33 is disposed at each side of the vehicle and is provided with a conventional mechanical brake controlled by a link 36 operated by a conventional foot pedal 37. These brakes may be used particularly when the machine is being operated along a highway in moving from place to place.

The frame may be provided with a pair of spaced parallel reinforcing bars 38 (Fig. 2) connected by struts 39 to the under side of the frame.

A vertically extending bearing 40 is fixed to the forward end of the frame 10 and pivotally supports a fork 41 to provide for steering the vehicle, a drive wheel 42 being rotatably mounted in the fork. A horizontally extending platform 43, mounted on the fork carries a power plant or motor 44, which through suitable transmission and driving chains rotates the driving traction wheel 42, thereby moving the machine over the ground. The fork 41 is rotated in bearing 40 by means of worm gearing in a housing 45 operated by a steering wheel 46. The transmission of power from the motor 44 to the driving wheel includes a variable speed belt system 47 in which one pulley 48 mounted on the motor shaft may have its effective diameter increased while another pulley 49 which drives the input shaft of a variable speed transmission 49A has its effective diameter decreased and vice versa, thereby providing for extremely accurate control of the speed of movement of the harvester over the ground with constant speed operation of the power plant. The power plant 44 through another pulley 49 on the opposite end of its motor shaft and belt 50 drives a pulley 51 connected to a flexible driving cable 52 which in turn drives shaft 53 through a worm and worm gear in a housing 54. A shaft 53 is disposed transversely of the machine and has driving sprockets 121 and 122 on each side of the machine by means of which conveyor chains 123 and 124 located at opposite sides of the machine are driven. Each conveyor chain is composed of a series of outside links 125 connected to inside links 126 connected by rivets 127 with spacing sleeves 128. The outside links 125 are provided with center openings 129 in certain of which are disposed mounting pins 130 secured in position by yoke fasteners 131 at one end and with the opposite ends of the mounting pins extending into a sleeve 132 riveted into the upper end of an arm or member 133.

The lower end of the arm 133 is bent outwardly at approximately right angles and forms one arm or side 134 of a fork or clip and a second curved side 135 of such fork is secured by a pivot 136 to the base or inner portion of the arm 134, the arm 135 having an offset 135' so that the ends of the arms are in the same plane. The arm 134 is provided with a lateral portion forming a stop 137 for limiting the movement of the arms toward each other. The arms 134 and 135 are provided with openings 138 and 139 respectively in which the ends of a helical spring 140 are engaged to cause the free ends of the arms to be moved toward each other. Between these arms or within the clip thus formed a plurality of stems of tobacco are adapted to be inserted so that they can be carried along by the conveyor and subsequently removed. To facilitate the operation of these arms they may have contiguous rounded portions and to prevent gumming, bolts or rivets 141 are provided in the ends of the arms on which are mounted two pairs of spaced disks 142, the disks of each pair being disposed on opposite sides of its supporting arm. By using disks which are freely rotatable, gum from tobacco will not accumulate sufficiently to interfere with the operation and does not have to be removed by scraping.

The conveyor 124 is provided for carrying tobacco from a position near the ground to a higher elevation above the platforms and along an upper run 143 from which the tobacco can be removed and placed on sticks 144. Each conveyor has portions located adjacent the two seats 26 so that tobacco can be placed in the clips or holders by workman seated on the seats at each side of the machine. In order to dispose the conveyors in the proper position for unloading each is mounted on upper sprockets 145 and 146 so that their upper edges are at approximately the same level. These sprockets are mounted on a Y frame having legs 147 and 148, such Y frame being secured to a base plate 149 by U-bolts 17 to tubular cross members 12 and such Y frame including a depending tube 150 having set screws 151 for engagement with the shank 152 of an adjustable tubular support for the sprocket 153 located near the front seat 26 (Fig. 2).

From the front end of its upper run 143 each conveyor extends downwardly around a driving sprocket by means of which it is driven. From the sprocket 153 the conveyor extends upwardly around a sprocket 154 carried by a bracket 155 which, like the other brackets, is adjustable and is secured to a cross member 12 by means of a U-clamp 17. From the sprocket 154 the conveyor has an inclination downwardly and rearwardly about sprockets 156 and 157 carried on opposite ends of the diverging arms of a bracket 158 which is rigidly mounted on a transverse tubular bar 16. Thus, the conveyor extends around driving sprockets 121 and 122 up and over sprockets 145 and 146, down and around sprockets 156 and 157, up and over sprockets 154, down and around adjustable sprocket 153 and then again to the drive sprockets 121 and 122.

The clips with the disks 142 are disposed at spaced intervals alternately on opposite sides of the conveyors and convenient to the workmen or primers near the ground and so that the tobacco leaves from the four rows worked at one time will be uniformly spaced.

Tobacco removed from the upper runs of the conveyor is adapted to be placed on sticks 144 disposed longitudinally of the machine and resting on rotary supports. These supports comprise mounting bars 159 having fixed pivot pins 161, such pins being pivotally mounted in stanchions 162 mounted on the platform 13. The outer ends of the pivot pins 161 are provided with sprockets 163 which engage chains 164 and sprockets 165 on a common shaft 166. Thus the arms 159 are mounted and maintained in the same relation. In order to stop the mounting bars in a definite position they are provided with depressions for the reception of the rounded heads of locking pins 169 mounted in the stanchions 162, such pins being provided with adjusting nuts for applying tension to the spring means which urges the rounded head of the locking pin into the depression in the arm 159.

In order to support tobacco sticks, pairs of brackets 172 are provided, each having a bifurcated end in which the tobacco stick can rest, said bracket also having an upstanding supporting arm 174 mounted on a pivot in the arm 159. The arm 174 of the bracket 172 serves as an abutment against which the ends of the stick may engage. One of these brackets 172 is disposed at each end of the bar 159 and since the bars are in pairs one at each end of the tobacco stick, the stick may be removably supported in opposite positions on the rack. The stick in the uppermost position is adapted to have tobacco strung in depending position thereon and when filled, pressure may be exerted to cause the rounded head of the locking pin to move from the depression and permit the stick to swing downwardly with its ends held in opposed brackets whereupon an empty tobacco stick previously applied to the brackets 172 of the rack at the lower ends of the bars 159 will be brought into uppermost position where it can be loaded and the process repeated. When the filled sticks are removed they may be stored on racks 176 at the rear of the machine.

Guards 246 are provided to embrace a portion of each of the various sprockets adjacent the incoming side of the conveyor chain to prevent any possibility of the workmen's hands or clothes being drawn into the sprocket thereby rendering the machine safe even though the major portion of the sprockets and chains are normally exposed.

It will be obvious to those skilled in the art that various changes may be made in the invention without departing from the spirit and scope thereof and therefore the invention is not limited by that which is illustrated in the drawings and described in the specifications, but only as indicated in the accompanying claims.

What is claimed is:

1. In a tobacco harvester, the combination of a conveyor and a series of leaf suspending clips mounted in spaced relation thereon, said conveyor comprising links having longitudinally spaced transverse openings therein, pivots located in said openings and adjustably supporting said clips along said conveyor so that the spacing of said clips and the time lapse between the passing of adjacent clips can be varied, each clip being swingably suspended from one of said pivots and having a pair of relatively movable arms, a pair of rollers one rotatively mounted on each arm in spaced relation to the pivot on which said clip is supported, said rollers having their convex surfaces in close proximity providing a throat between which tobacco leaves may be inserted and said rollers separated thereby sufficiently to permit passage of the leaves therebetween, a tension spring having its ends attached to said arms with one end of said spring closely adjacent to each of said rollers and urging said rollers toward each other, said spring serving to limit the movement of the leaves into the clip and also serving with the adjacent portions of said rollers to define a relatively small triangular gripping area for the tobacco leaves so that the leaves will be firmly engaged on three sides, the structure and mounting of each clip being such that the bulk and weight of the clip including its gripping area is located below its pivotal support so that the tobacco leaves held thereby will be in depending position at all times.

2. In a tobacco harvester, a chain conveyor and a series of leaf clips adjustably mounted on said conveyor and a series of leaf clips adjustably mounted on said conveyor in longitudinally spaced relation, said conveyor comprising links having longitudinally spaced transverse pivot-receiving openings therein, clip supporting pivots in certain of said openings said clips being mounted to swing on said pivots and each including a pair of arms pivoted to swing one relative to the other, a pair of rollers one on each arm having their convex surfaces in close proximity providing a throat between which tobacco leaves may be inserted so that said rollers move apart sufficiently to permit the passage of the tobacco, said rollers being located on the end portions of said arms remote from said clip supporting pivot, a tension spring having its ends connected one to each of said arms closely adjacent to the roller thereon, said rollers and said spring defining a gripping area in which the leaves will be engaged on three sides, the structure and mounting of each clip being such that the bulk and weight of the clip including its gripping area is located below its pivotal support so that the tobacco leaves held thereby will be in depending position at all times.

3. In a tobacco harvester the combination of a conveyor and a series of leaf suspending clips thereon, pivots for supporting said clips along said conveyor, each clip comprising a pair of relatively movable arms swingably suspended from said pivot, a pair of rollers carried one on each arm in spaced relation from said pivot, said rollers being rotatably mounted with their contiguous portions in close proximity providing a convex throat between which tobacco leaves may be inserted to thereby move said rollers apart and permit said leaves to pass therebetween, a spring having one of its ends attached to one arm and having its other end attached to the other arm closely adjacent to said rollers and urging said rollers toward each other under tension, said spring and the adjacent portions of said rollers defining a relatively small triangular gripping area for tobacco leaves so that said leaves will be engaged and a firm grip exerted on three sides of the same, said clips being pivoted in spaced relation on said conveyor so that the major portion of said clip and the gripping area thereof will be located below the pivot which supports the clip and the tobacco leaves will be suspended in depending position at all times.

4. In a tobacco harvester, an endless conveyor having a predetermined run, and at least one tobacco plant securing clip mounted on said conveyor and having a constant orientation position in all directions of angular disposition of the run of said conveyor, said conveyor including means freely journaling said clip thereon with the clip below said means and subject to the effect of gravity thereon, said clip including a pair of spaced arms supported by said means in laterally spaced depending relation therefrom, said arms being displaceable relative to each other and including terminal portions comprising opposed arcuate surfaces converging and diverging intermediately and forming a laterally opening throat and two sides of a substantially triangular space extending toward the means on said conveyor, a tension spring extending at opposite ends from each of said arms and normally urging the same together, said spring being spaced from the intermediate portion of said arcuate surfaces and defining with the diverging portions thereof a substantially triangular space laterally of the run of said conveyor for removably receiving and gripping tobacco plant stems therein in the constant position of orientation assumed by the clip.

5. The structure of claim 4 in which said terminal portions of said arms comprise a circular element journaled on the terminal end of each of said arms and a portion of the outer periphery thereof comprises said arcuate surfaces, said tension spring being disposed in substantially adjacent relation to the outer periphery of said circular elements.

6. The structure of claim 4 in which said endless conveyor comprises a link chain, and said means freely journaling the clip therein comprises a transverse aperture in said chain, and a retaining element extending through said aperture, at least one of the arms of said clip being journaled on said retaining element.

No references cited.